United States Patent
Salunke

(10) Patent No.: US 8,807,842 B2
(45) Date of Patent: Aug. 19, 2014

(54) SEALING ASSEMBLY IN A THRUST BEARING KING PIN APPLICATION

(75) Inventor: Suresh T. Salunke, Thane (IN)

(73) Assignee: NRB Bearings Ltd., Thane, Maharashtra (IN)

( * ) Notice: Subject to any disclaimer, the term of this patent is extended or adjusted under 35 U.S.C. 154(b) by 0 days.

(21) Appl. No.: 13/695,538

(22) PCT Filed: May 5, 2011

(86) PCT No.: PCT/IN2011/000315
§ 371 (c)(1),
(2), (4) Date: Oct. 31, 2012

(87) PCT Pub. No.: WO2011/138800
PCT Pub. Date: Nov. 10, 2011

(65) Prior Publication Data
US 2013/0051721 A1  Feb. 28, 2013

(30) Foreign Application Priority Data
May 5, 2010  (IN) .......................... 1429/MUM/2010

(51) Int. Cl.
*F16C 33/76* (2006.01)
(52) U.S. Cl.
USPC ............................ 384/607; 384/477; 384/486
(58) Field of Classification Search
USPC .......... 384/477, 484–486, 489, 590, 607, 618
See application file for complete search history.

(56) References Cited

U.S. PATENT DOCUMENTS

| 3,294,413 A | 12/1966 | Jurosek | |
|---|---|---|---|
| 3,844,631 A | 10/1974 | Otto | |
| 4,958,947 A * | 9/1990 | Peter et al. | 384/609 |
| 5,618,116 A * | 4/1997 | Ishikawa | 384/607 |
| 5,803,621 A | 9/1998 | Assmann | |
| 2005/0104302 A1* | 5/2005 | Matsui et al. | 277/562 |
| 2008/0267547 A1* | 10/2008 | Thompson | 384/477 |
| 2009/0220181 A1* | 9/2009 | Yamada et al. | 384/513 |

FOREIGN PATENT DOCUMENTS

| EP | 0074847 A1 * | 3/1983 |
|---|---|---|
| FR | 2091152 A5 * | 1/1972 |
| FR | 2173552 A5 * | 10/1973 |

* cited by examiner

*Primary Examiner* — Richard W Ridley
*Assistant Examiner* — Yamilka Pinero Medina

(57) ABSTRACT

A thrust bearing with a improved sealing assembly includes external envelop such as with close rim at both ends having flat face to provide room for rubber lip folding and sealing such as double lip seal with two axial lips. The axis of rubber lips are inclined with relevant mating part. The extreme ends of the envelop envelops the delicate lip of rubber seals. The portion of the envelop ID [20] is put in a manner to guides roller cage assembly and create sealing at [08, 09]. The bearing external envelop is used as stiffener for body of double lip seal. The shape and design of the external machine cover face accommodate lips of seals, protect seals lips and hold the bearing together.

11 Claims, 4 Drawing Sheets

SEALING ASSEMBLY IN A THRUST BEARING KING PIN APPLICATION

FIELD OF THE INVENTION

The present invention generally relates to a sealing assembly in a thrust bearing king pin application and thrust load application. The present invention particularly relates to a sealing assembly in a thrust cylindrical roller bearing assembly comprising of a sealing device for inhibiting/preventing the entry of pollution in the bearing and allow leakage of lubrication to mating parts of king pin knuckle joints.

The present invention more particularly relates to king pin application/thrust load application cylindrical thrust bearing assembly comprising of a double lip seal on radial direction and on faces having stainless steel machined sleeve stiffener acting as an envelop to the bearing assembly. The present invention provides a life long lubrication. The new concept is made out of machined part and adds a new function of double sealing at top and bottom side to the knuckle face. By adding a additional sealing friction gets deduced.

DESCRIPTION OF THE PRIOR ART

The previously known thrust cylindrical roller bearing consists of envelop, cylindrical rollers, plastic cage, top washer, bottom washer, external O-ring and internal O-rings packed with grease. This bearing required additional protection because of pollution and entry of foreign particles from top and bottom side of the knuckle, when radial and axial side rubber lip on bottom washer damages and allows entry of foreign particles.

It is known from the existing prior art that the bearing has no sealing on the top side and no additional sealing on bottom side, which results in generation of contaminants in the bearing. However, premature failure of the bearing used to occur due to the entry of liquids such as water within the bearing assembly. It has therefore always been a matter of concern in the industry relating to the problem of bearing failures and failure of king pin parts and in similar polluted applications. Sometime seals were disassembled from bottom washers in field and if proper orientation of bearing was not ensured during reassembly, life long lubrication could not be attended.

The study of prior art also finds reference to use of double lip seals as sealing device. However, double radial and axial lip seal has not been used effectively for sealing certain types of chambers such as roller bearing chamber, because of space; and if more space is allotted without changing the overall width and outer diameter of the bearing, it will result in space constraint and reduction of load rating of bearing and hence will reduce bearing life. Moreover, bottom side lip was directly open to air and direct hit of mud and hard particle can damage lips.

OBJECT OF THE PRESENT INVENTION

The problems and disadvantages associated with prior to this invention are addressed in accordance with present invention in which double lip seals with stiffeners and stainless steel envelop are provided within compact width and out side diameter of bearing.

SUMMARY OF INVENTION

The primary object of the present invention is to provide efficient and compact bearing assembly consisting of sealing means such as double lip radial and axial seal within its chamber with life long lubrication. It is the object of the invention to render effective the use of double lip seal with certain inventive structural additions and improvements by converting face of external envelope. It is further object of the invention to avoid damage to the delicate lips of double radial and axial lip seal due to direct expose to out side environment by special shape of machined stainless steel envelope to protect bearing assembly & shaft, also to protect the seals lips from getting damaged by hard foreign bodies while handling/mounting the bearings. It is further object of the invention to accommodate the double lip seals within the chamber of the bearing assembly to preserve grease for permanent lubrication for low friction torque.

As per one of the preferred embodiments of the present invention, bearing external envelop is used as stiffener for body of double lip seal. As per another preferred embodiment, the present invention also provides sealing on top and bottom portion of knuckle and both thrust faces of bearing. Another embodiment of the present invention provides at least two axial lips wherein one external lip of envelop prevents entry of foreign particle & pollutants into the bearing assembly and the other internal axial lip on washer prevents foreign particles. Internal surface of envelop serve as contact portion to lip for sealing and allow to flow grease out to lubricate are guided by shell. The portion of external envelope gives room to the external axial lip of the seal for proper sitting inside within specified boundary dimension of bearing. Additional embodiment is the use of a top washer press fitted in external machined envelop, which oscillates or rotates with top washer.

DESCRIPTION OF THE DRAWINGS

The present invention will now be described with reference to the drawings accompanying the specification, wherein the same numerals represent the same parts and wherein.

DETAILED DESCRIPTION OF THE INVENTION

Figure 1:
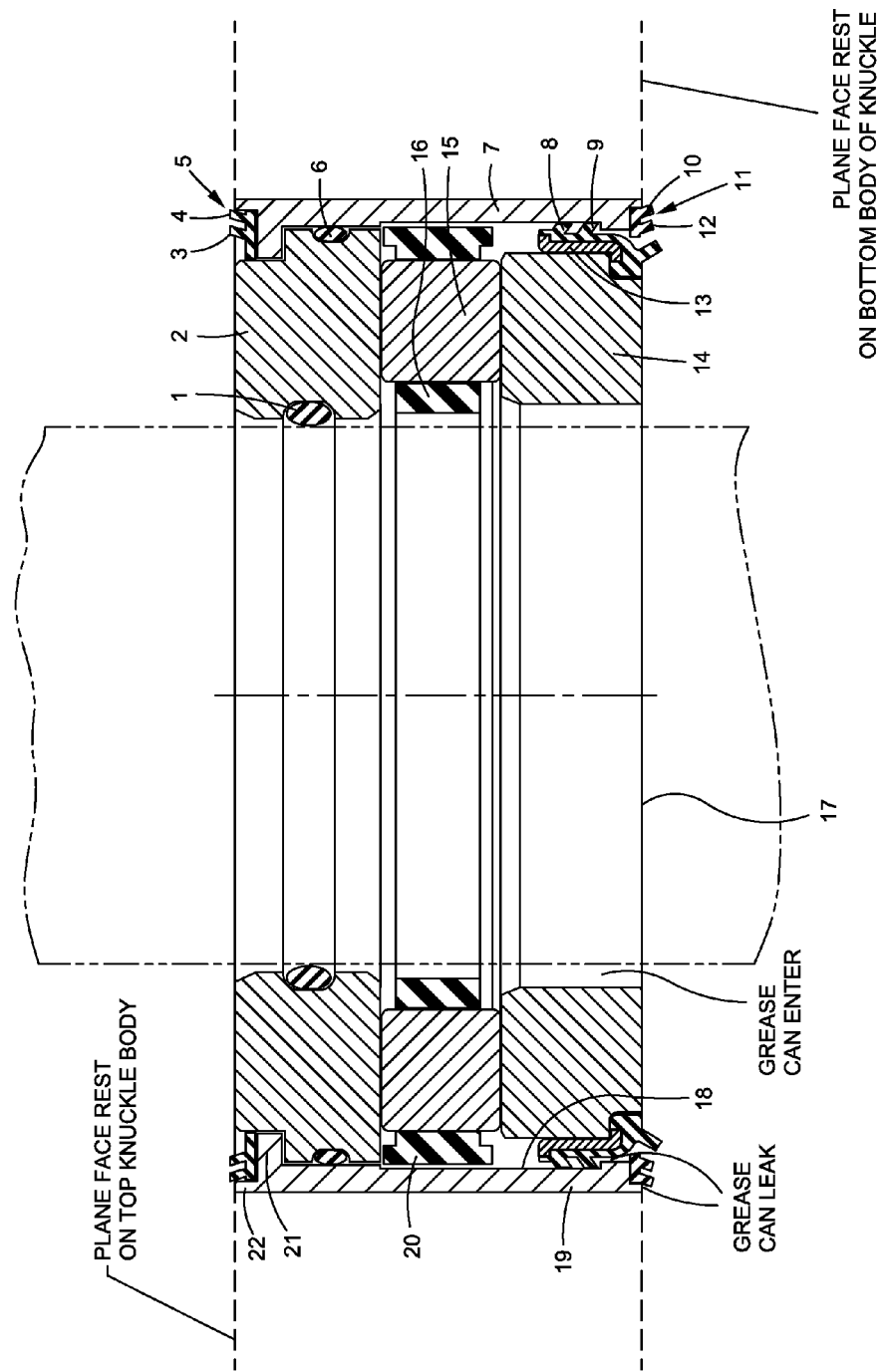
FIG. 1 shows the cross-sectional view of the embodiment of the present invention.
Figure 2:
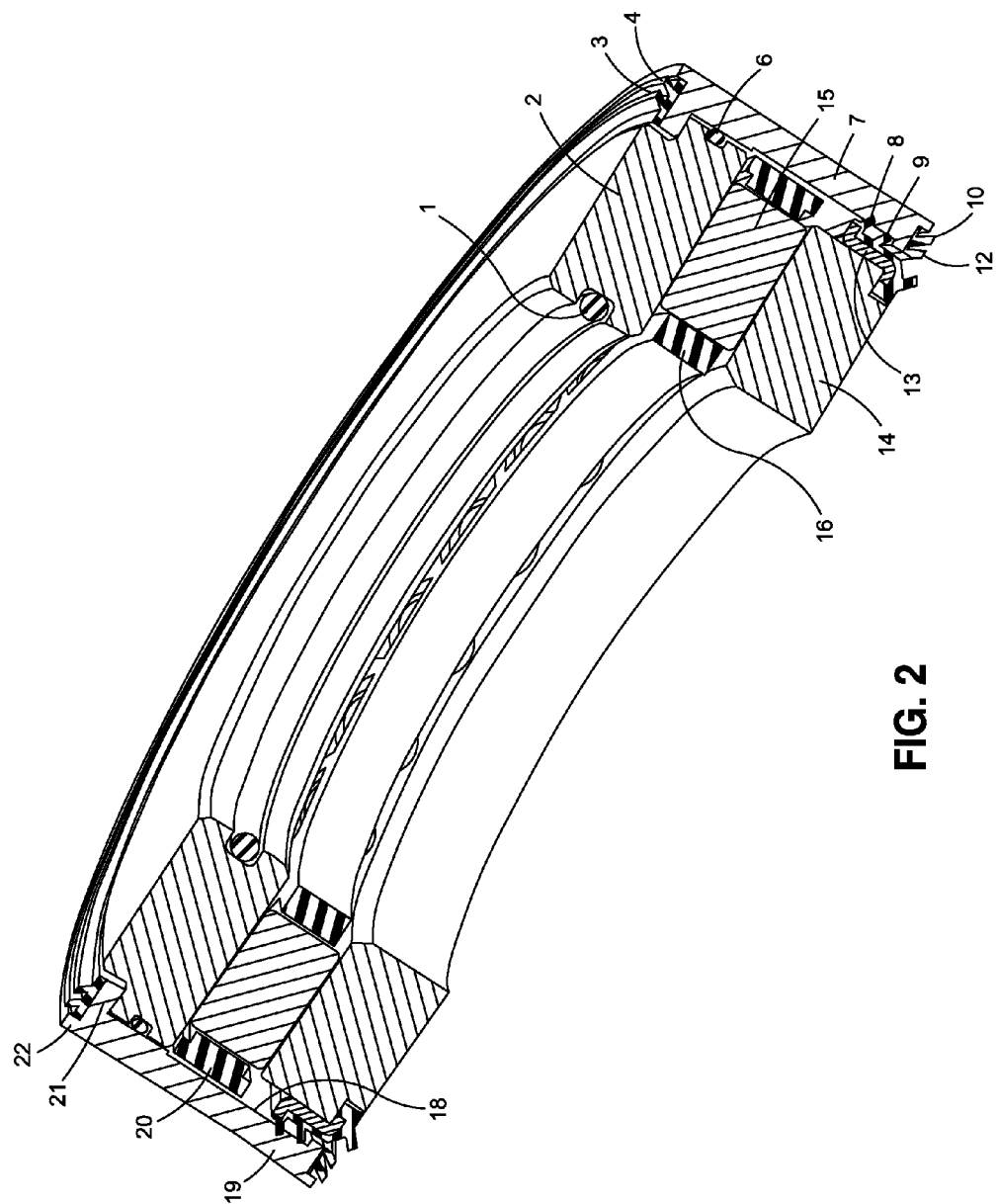
FIG. 2 shows the schematic cross-sectional view of the embodiment of the present invention assembled in kingpin.
Figure 3:
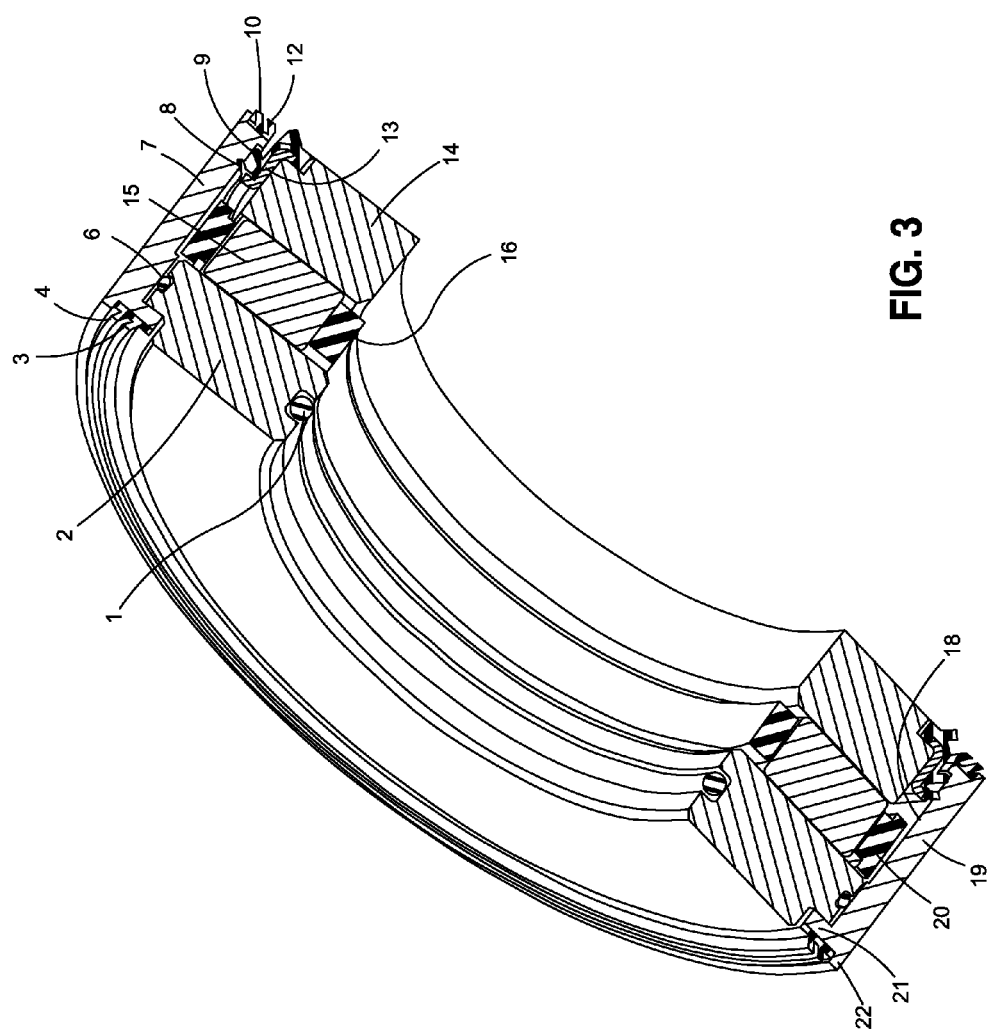
FIG. 3 shows the schematic cross-sectional view of the embodiment of the present invention assembled in kingpin shows the comparison of the old and new design.
Figure 4:
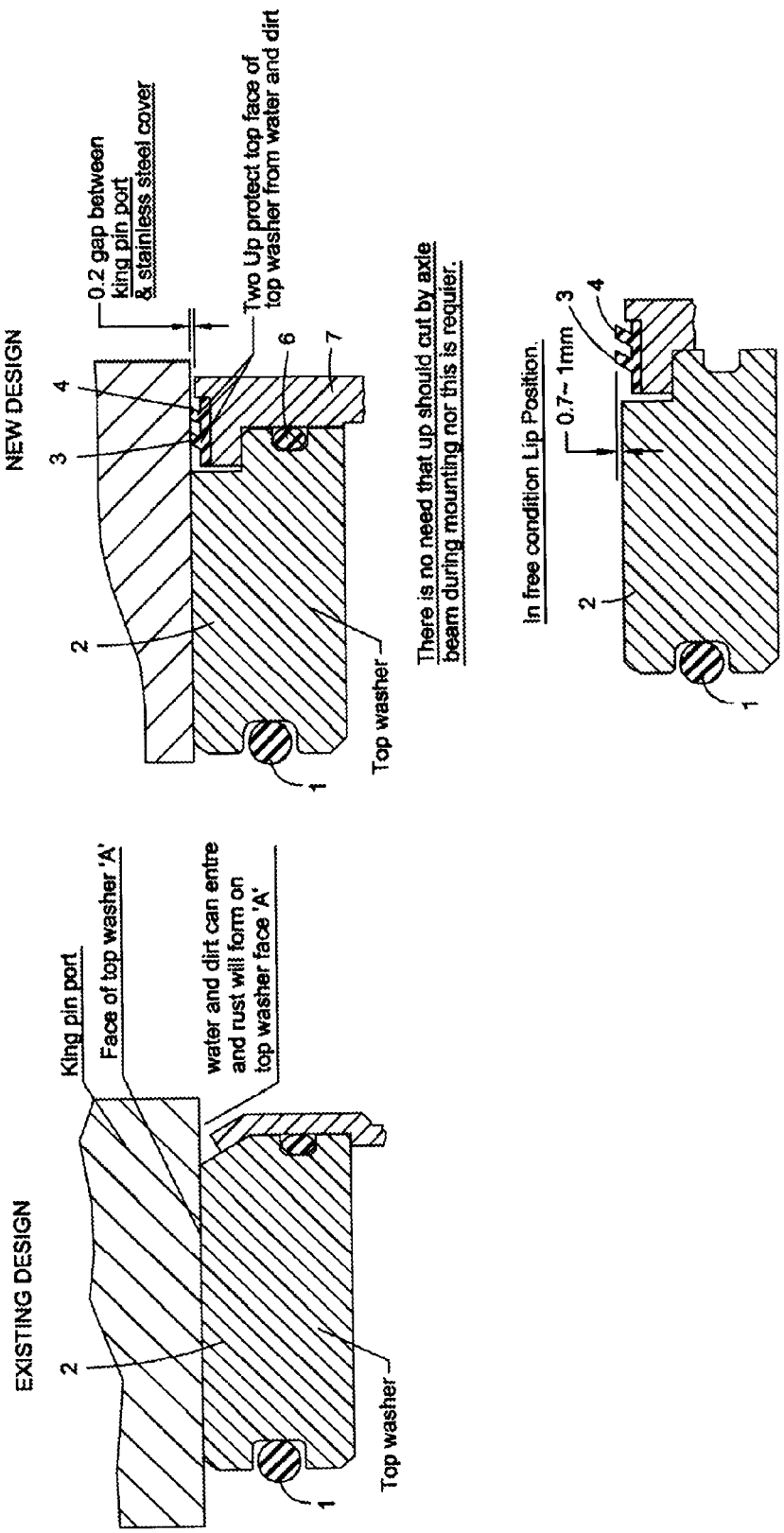
FIG. 4 shows schematic and comparative cross-sectional view of the embodiment of the present invention assembled in kingpin.

With reference to FIGS. 1, 2, and 3, the bearing assembly contains external envelop [07] made up of special alloy stainless steel material and cylindrical machined parts with close rim at both end to hold seals, washers and rollers. In the bearing assembly, external envelop [07] acts as external portion of the bearing and holds rolling elements, cage, top washer, bottom washer and guides those during oscillation or rotation. It also acts as means to keep integer all part together. The envelop [07] contains flat face [19, 21] to provide room for rubber lip holding. The extreme end [11, 22] envelops the delicate lip of rubber seals and protects them from the external factors. The portion of the envelop ID [20] guides roller cage assembly [15, 16] and create sealing at [08, 09]. As per one of the preferred embodiment of present invention the washer portion [02, 14] prevented with contamination by rubber seal lips [03, 04, 10, and 12]. The portion [22] is closely guided by top and bottom face of knuckle and hard particle greater than 0.1 mm will not hit and damage rubber lips [03, 04, 10, and 12]. The external O-ring [06] provides additional sealing between top washer OD and External cover ID and protects bearings from contamination.

As per the present invention the rubber seal lips [08, 09, 10, 12] is made up allows to flow out excess grease and lubricate other parts of kingpin assembly. The rubber seal [08, 09, and 12] has low carbon steel metal stiffener [14] and press fitted on outer diameter of bottom washer [14]. The rubber seal [03, 04, 08, 09, 10,] may be produced by molding, wherein the machined external cover attached to the seal so as to have a simultaneous bonding of resilient material to form an integral part thereof. Rubber seal metal stiffener [13] fitted on bottom washer [14] prevents entry of foreign material including pollutants into bottom washer [14] face and bottom knuckle face. The lip [03, 04, 08, 09, 10, 13] are arranged in the assembly in such a manner that it can get folded to prevent entry of pollution from outside to inside bearing and excess lubrication can flow out from bearing.

As per the present invention for this plastic cage [16] has groove [20] on outer diameter of cage to flow grease from inside to out side of bearing.

This entire arrangement permits the escape of any excess lubricant or grease from bearing assembly while assembling bearing on shaft and excess grease floating below the level of shaft Outer diameter.

The embodiments of the invention described, referred hereinabove are calculated to overcome the hurdles and achieve benefits, and advantages as hereinabove set forth. It may be possible to further modify and improve the described invention within the scope of the unity of the present invention.

I claim:

1. A generally cylindrical thrust bearing assembly comprising:
    an external envelope machined as non-separable cylindrical part, said envelope having first and second close rims that are configured to contain seals, washers and rollers within the thrust bearing assembly and thereby to keep all parts of the thrust bearing assembly as a unitary piece when in use, a portion of the envelope being further configured to guide a roller cage assembly within the thrust bearing assembly;
    a first rubber seal extending around the assembly proximate the first close rim, the first rubber seal having a first plurality of lips formed proximate the circumference of the assembly at an angle acute to the circumference of the assembly;
    a second rubber seal extending around the assembly proximate the second close rim, the second rubber seal having a second plurality of lips formed proximate the circumference of the assembly at an angle acute to the circumference of the assembly, the second plurality of lips thereby forming a barrier to entry of contaminates into the thrust bearing assembly;
    a top and bottom face that create a void to provide space for a circumferential folding rubber lip, the circumferential rubber lip having a plurality of circumferentially extending angular lips that are configured to create a unidirectional seal between the void and the second close rim, the unidirectional seal designed to permit leakage of lubrication from the void but block contamination from entering the void; and
    an external O-ring for creating a seal between a top washer and the envelope.

2. A thrust bearing assembly as claimed in claim 1, wherein said envelope acts as an external cover of the bearing to hold the rollers, the roller cage assembly, a top washer, a bottom washer, and any all bearing components and guides in place during oscillation or rotation.

3. A thrust bearing assembly as claimed in claim 1, wherein the machined external envelope is made of a special alloy stainless steel material that protects the thrust bearing assembly from contamination and further protects the envelope from decomposition.

4. A thrust bearing assembly as claimed in claim 1, wherein at least one of the first and second rubber seals includes at least one of a double lip radial or an axial seal.

5. A thrust bearing assembly as claimed in claim 1, wherein the circumferentially extending angular lips comprise a non-metallic alloy.

6. A thrust bearing assembly as claimed in claim 1, wherein at least one of the first and second rubber seals comprises a low carbon steel metal stiffener press fitted on an outer diameter of a bottom washer.

7. A thrust bearing assembly as claimed in claim 6, wherein the rubber seal metal stiffener prevents contamination of the bottom washer in radial and axial directions.

8. A thrust bearing assembly as claimed in claim 1, wherein a gap of between 0.1 mm and 0.25 mm is formed between the first plurality of lips and the top and bottom faces.

9. A thrust bearing assembly as claimed in claim 1, wherein the acute angles of the first and second plurality of lips are at an angle of between 28 degrees and 46 degrees thereby allowing smooth folding.

10. A thrust bearing assembly as claimed in claim 1, wherein the roller cage assembly includes an outer diameter that comprises grooves having depth of between 0.3 mm and 0.6 mm and a width of between 2 mm and 5 mm to guide the leakage of lubricant and prevent entry of contamination.

11. A thrust bearing assembly as claimed in claim 1, wherein the external envelope has an inter recess that ranges between 1 mm and 2 mm on the top and 0.2 mm and 0.8 mm at the bottom.

* * * * *